United States Patent
Fisher (10) Patent No.: US 9,652,771 B2
(45) Date of Patent: May 16, 2017

(54) INDUCTION BASED TRANSACTIONS AT A MOBLE DEVICE WITH AUTHENTICATION

(71) Applicant: Michelle Fisher, Marina Del Rey, CA (US)

(72) Inventor: Michelle Fisher, Marina Del Rey, CA (US)

(73) Assignee: Michelle Fisher, Berkeley, CA (US)

(*) Notice: Subject to any disclaimer, the term of this patent is extended or adjusted under 35 U.S.C. 154(b) by 0 days.

(21) Appl. No.: 15/175,150

(22) Filed: Jun. 7, 2016

(65) Prior Publication Data
US 2016/0314457 A1    Oct. 27, 2016

Related U.S. Application Data

(63) Continuation of application No. 13/620,632, filed on Sep. 14, 2012, now Pat. No. 9,378,493, which is a
(Continued)

(51) Int. Cl.
*H04B 1/38* (2015.01)
*G06Q 20/00* (2012.01)
(Continued)

(52) U.S. Cl.
CPC ......... *G06Q 20/401* (2013.01); *G06Q 20/102* (2013.01); *G06Q 20/108* (2013.01);
(Continued)

(58) Field of Classification Search
CPC ............... G06Q 20/3278; G06Q 20/32; G06Q 20/3226; G06Q 20/3227; G06Q 20/3821; G06Q 20/20; G06Q 20/3223; G06Q 20/325; G06Q 20/3229; G06Q 20/327; G06Q 20/367; G06Q 30/0238; G06Q 30/06; G06Q 20/4012; G06Q 20/4014; G06Q 30/0267; G06Q 20/16; G06Q 20/3674;
(Continued)

(56) References Cited

U.S. PATENT DOCUMENTS

| 6,038,367 | A | 3/2000 | Abecassis |
| 6,101,483 | A | 8/2000 | Petrovich |

(Continued)

FOREIGN PATENT DOCUMENTS

| EP | 1503352 | 7/2004 |
| WO | WO 2006095212 A1 | 9/2006 |

OTHER PUBLICATIONS

U.S. Appl. No. 11/933,337, Office Action ailed May 27, 2010, 9 p.
(Continued)

*Primary Examiner* — Olumide T Ajibade Akonai (57) ABSTRACT

A method for transmitting data between a mobile communication device and a server. The method includes running a mobile application on the mobile communication device. The mobile application is hosted on the mobile communication device through the server as a Software as a Service (SaaS). The method further includes transmitting data associated with the mobile application between the mobile communication device and the server, in which transmission of the data between the mobile communication device and the server is monitored through the server.

19 Claims, 2 Drawing Sheets

Related U.S. Application Data continuation of application No. 11/939,821, filed on Nov. 14, 2007, now Pat. No. 8,290,433.

(51) Int. Cl.

| | | |
|---|---|---|
| *G06Q 30/00* | (2012.01) | |
| *G06Q 40/00* | (2012.01) | |
| *G06Q 20/40* | (2012.01) | |
| *H04W 4/00* | (2009.01) | |
| *G06Q 20/34* | (2012.01) | |
| *G06Q 20/36* | (2012.01) | |
| *G06Q 20/10* | (2012.01) | |
| *H04B 5/00* | (2006.01) | |
| *G06Q 30/02* | (2012.01) | |
| *H04W 12/06* | (2009.01) | |
| *G06Q 20/38* | (2012.01) | |
| *G06Q 20/32* | (2012.01) | |
| *H04W 88/06* | (2009.01) | |
| *H04L 29/06* | (2006.01) | |
| *H04W 12/08* | (2009.01) | |

(52) U.S. Cl.
CPC ......... *G06Q 20/32* (2013.01); *G06Q 20/3223* (2013.01); *G06Q 20/3229* (2013.01); *G06Q 20/3278* (2013.01); *G06Q 20/3552* (2013.01); *G06Q 20/367* (2013.01); *G06Q 20/382* (2013.01); *G06Q 30/0238* (2013.01); *H04B 5/0031* (2013.01); *H04W 4/008* (2013.01); *G06Q 20/3226* (2013.01); *G06Q 20/3227* (2013.01); *G06Q 20/3821* (2013.01); *H04L 63/102* (2013.01); *H04L 2209/56* (2013.01); *H04W 12/06* (2013.01); *H04W 12/08* (2013.01); *H04W 88/06* (2013.01)

(58) Field of Classification Search
CPC .... G06Q 20/352; H04W 4/008; H04W 12/06; H04W 12/08; H04W 88/06; H04W 4/02; H04W 4/005
USPC ....... 455/405, 406, 407, 408, 409, 410, 411, 455/414.1, 418, 419, 550, 552.1, 553.1, 455/556.1, 557, 558, 41.1, 41.2, 41.3; 705/26.1, 39, 40, 42, 64, 75; 235/379, 235/380, 492
See application file for complete search history.

(56) References Cited

U.S. PATENT DOCUMENTS

| | | |
|---|---|---|
| 6,115,601 A | 9/2000 | Ferreira |
| 6,123,259 A | 9/2000 | Ogasawara |
| 6,128,655 A | 10/2000 | Fields |
| 6,141,666 A | 10/2000 | Tobin |
| 6,199,082 B1 | 3/2001 | Ferrel |
| 6,250,557 B1 | 6/2001 | Forslund |
| 6,415,156 B1 | 7/2002 | Stadelmann |
| 6,450,407 B1 | 9/2002 | Freeman |
| 6,587,835 B1 | 7/2003 | Treyz |
| 6,605,120 B1 | 8/2003 | Fields |
| 6,771,981 B1 | 8/2004 | Zalewski |
| 6,772,396 B1 | 8/2004 | Cronin |
| 6,886,017 B1 | 4/2005 | Jackson |
| 6,941,270 B1* | 9/2005 | Hannula ............... G06Q 20/027 705/500 |
| 6,950,939 B2 | 9/2005 | Tobin |
| 7,031,945 B1 | 4/2006 | Donner |
| 7,069,248 B2 | 6/2006 | Huber |
| 7,096,003 B2 | 8/2006 | Joao |
| 7,110,744 B2 | 9/2006 | Freeny |
| 7,110,792 B2 | 9/2006 | Rosenberg |
| 7,127,236 B2 | 10/2006 | Khan |
| 7,200,578 B2 | 4/2007 | Paltenghe |
| 7,289,810 B2 | 10/2007 | Jagadeesan |
| 7,308,254 B1 | 12/2007 | Rissanen |
| 7,357,312 B2 | 4/2008 | Gangi |
| 7,379,920 B2 | 5/2008 | Leung |
| 7,472,829 B2 | 1/2009 | Brown |
| 7,482,925 B2 | 1/2009 | Hammad |
| 7,493,284 B2 | 2/2009 | Celi et al. |
| 7,512,567 B2 | 3/2009 | Bemmel |
| 7,522,905 B2 | 4/2009 | Hammad |
| 7,784,684 B2 | 8/2010 | Labrou |
| 7,870,077 B2 | 1/2011 | Woo |
| 7,979,519 B2 | 7/2011 | Shigeta |
| 8,005,426 B2 | 8/2011 | Huomo |
| 8,019,362 B2 | 9/2011 | Sweatman |
| 8,073,424 B2 | 12/2011 | Sun |
| 8,086,534 B2 | 12/2011 | Powell |
| 8,109,444 B2 | 2/2012 | Jain |
| 8,121,945 B2 | 2/2012 | Rackley |
| 8,127,984 B2 | 3/2012 | Zatloukal |
| 8,423,466 B2* | 4/2013 | Lanc ..................... G06Q 20/32 705/35 |
| 2001/0011250 A1 | 8/2001 | Paltenghe |
| 2001/0044751 A1 | 11/2001 | Pugliese |
| 2002/0056091 A1 | 5/2002 | Bala |
| 2002/0059100 A1 | 5/2002 | Shore |
| 2002/0063895 A1 | 5/2002 | Agata |
| 2002/0065774 A1 | 5/2002 | Young |
| 2002/0077918 A1 | 6/2002 | Lerner |
| 2002/0082879 A1 | 6/2002 | Miller |
| 2002/0107756 A1 | 8/2002 | Hammons |
| 2002/0160761 A1 | 10/2002 | Wolfe |
| 2002/0169984 A1 | 11/2002 | Kumar |
| 2003/0061113 A1 | 3/2003 | Petrovich |
| 2003/0065805 A1 | 4/2003 | Barnes |
| 2003/0074259 A1 | 4/2003 | Slyman |
| 2003/0085286 A1 | 5/2003 | Kelley |
| 2003/0087601 A1 | 5/2003 | Agam |
| 2003/0093695 A1 | 5/2003 | Dutta |
| 2003/0105641 A1 | 6/2003 | Lewis |
| 2003/0132298 A1 | 7/2003 | Swartz |
| 2003/0140004 A1 | 7/2003 | O'Leary |
| 2003/0163359 A1 | 8/2003 | Kanesaka |
| 2003/0172028 A1 | 9/2003 | Abell |
| 2004/0006497 A1 | 1/2004 | Nestor |
| 2004/0030658 A1 | 2/2004 | Cruz |
| 2004/0034544 A1 | 2/2004 | Fields |
| 2004/0064408 A1 | 4/2004 | Kight |
| 2004/0073497 A1 | 4/2004 | Hayes |
| 2004/0127256 A1 | 7/2004 | Goldthwaite |
| 2004/0235450 A1 | 11/2004 | Rosenberg |
| 2004/0243519 A1 | 12/2004 | Perttila |
| 2004/0254836 A1 | 12/2004 | Emoke Barabas |
| 2004/0267618 A1 | 12/2004 | Judicibus |
| 2004/0267665 A1 | 12/2004 | Nam |
| 2005/0003810 A1 | 1/2005 | Chu |
| 2005/0040230 A1 | 2/2005 | Swartz |
| 2005/0076210 A1 | 4/2005 | Thomas |
| 2005/0165646 A1 | 7/2005 | Tedesco |
| 2005/0187873 A1 | 8/2005 | Labrou |
| 2005/0215231 A1 | 9/2005 | Bauchot |
| 2005/0269402 A1* | 12/2005 | Spitzer ................... G06Q 20/04 235/380 |
| 2006/0018450 A1 | 1/2006 | Sandberg-Diment |
| 2006/0031752 A1 | 2/2006 | Surloff |
| 2006/0074698 A1* | 4/2006 | Bishop ............ G06K 19/07749 705/50 |
| 2006/0089874 A1 | 4/2006 | Newman |
| 2006/0143091 A1 | 6/2006 | Yuan |
| 2006/0191995 A1 | 8/2006 | Stewart |
| 2006/0206709 A1 | 9/2006 | Labrou |
| 2006/0219780 A1 | 10/2006 | Swartz |
| 2006/0287004 A1* | 12/2006 | Fuqua ................ G06Q 20/0658 455/558 |
| 2007/0004391 A1 | 1/2007 | Maffeis |
| 2007/0011099 A1 | 1/2007 | Sheehan |
| 2007/0022058 A1 | 1/2007 | Labrou |
| 2007/0095892 A1 | 5/2007 | Lyons |
| 2007/0125838 A1 | 6/2007 | Law |

(56) References Cited

U.S. PATENT DOCUMENTS

| | | |
|---|---|---|
| 2007/0125840 A1 | 6/2007 | Law |
| 2007/0131759 A1 | 6/2007 | Cox |
| 2007/0138299 A1 | 6/2007 | Mitra |
| 2007/0145135 A1 | 6/2007 | Jogand-Coulomb |
| 2007/0156436 A1 | 7/2007 | Fisher |
| 2007/0210155 A1 | 9/2007 | Swartz |
| 2007/0235519 A1 | 10/2007 | Jang |
| 2007/0255662 A1 | 11/2007 | Tumminaro |
| 2007/0270166 A1 | 11/2007 | Hampel |
| 2007/0293155 A1 | 12/2007 | Liao |
| 2008/0010190 A1 | 1/2008 | Rackley |
| 2008/0010196 A1 | 1/2008 | Rackley |
| 2008/0017704 A1 | 1/2008 | Vandeburg |
| 2008/0045172 A1 | 2/2008 | Narayanaswami |
| 2008/0046366 A1 | 2/2008 | Bemmel |
| 2008/0048022 A1 | 2/2008 | Vawter |
| 2008/0051059 A1 | 2/2008 | Fisher |
| 2008/0051142 A1 | 2/2008 | Calvet |
| 2008/0052192 A1 | 2/2008 | Fisher |
| 2008/0052233 A1 | 2/2008 | Fisher |
| 2008/0116264 A1 | 5/2008 | Hammad et al. |
| 2008/0139155 A1 | 6/2008 | Boireau |
| 2008/0167988 A1 | 7/2008 | Sun |
| 2008/0177668 A1 | 7/2008 | Delean |
| 2008/0208681 A1 | 8/2008 | Hammad |
| 2008/0208743 A1 | 8/2008 | Arthur |
| 2008/0208744 A1 | 8/2008 | Arthur |
| 2008/0208762 A1 | 8/2008 | Arthur |
| 2008/0221997 A1 | 9/2008 | Wolfe |
| 2008/0255947 A1 | 10/2008 | Friedman |
| 2008/0275779 A1 | 11/2008 | Lakshminarayanan |
| 2008/0294556 A1 | 11/2008 | Anderson |
| 2008/0305774 A1 | 12/2008 | Ramakrishna |
| 2009/0063312 A1 | 3/2009 | Hurst |
| 2009/0098825 A1 | 4/2009 | Huomo |
| 2009/0106112 A1 | 4/2009 | Dalmia |
| 2009/0124234 A1 | 5/2009 | Fisher |
| 2009/0132362 A1 | 5/2009 | Fisher |
| 2009/0144161 A1 | 6/2009 | Fisher |
| 2009/0227281 A1 | 9/2009 | Hammad |
| 2010/0057619 A1 | 3/2010 | Weller |
| 2010/0063895 A1 | 3/2010 | Dominguez |
| 2011/0320316 A1 | 12/2011 | Randazza |

OTHER PUBLICATIONS

U.S. Appl. No. 11/933,351, Office Action mailed Oct. 3, 2008, 5 p.
U.S. Appl. No. 11/933,367, Office Action mailed May 27, 2010, 8 p.
U.S. Appl. No. 11/467,441, Office Action mailed May 27, 2009, 17 p.
U.S. Appl. No. 12/592,581, Office Action mailed Jun. 4, 2010, 20 p.
U.S. Appl. No. 11/933,351, Office Action mailed Jul. 8, 2009, 7 p.
U.S. Appl. No. 11/939,821, Office Action mailed Aug. 17, 2010, 11 p.
U.S. Appl. No. 11/933,351, Office Action mailed Aug. 18, 2010, 16 p.
U.S. Appl. No. 11/933,321, Office Action mailed May 27, 2010, 11 p.
Deena, M. Amato, "Mobile Rewards." Chain Store Age 82.5 (2006): 160, 161, 163. Hoover's Company Profiles; ProQuest Central. Web, Oct. 5, 2012.
"ViVOtech to Demonstrate Industry's First End-to-End Near Field Communication (NFC) Solution at the NRF Show." Business Wire: Jan. 16, 2006. Business Dateline; Hoover's Company Profiles; ProQuest Central, Web. Oct. 5, 2012.

* cited by examiner

INDUCTION BASED TRANSACTIONS AT A MOBILE DEVICE WITH AUTHENTICATION

CROSS-REFERENCE TO RELATED APPLICATIONS

This application is a continuation and claims priority to U.S. application Ser. No. 13/620,632 filed Sep. 14, 2012, titled, "MOBILE COMMUNICATION DEVICE SECURE NEAR FIELD COMMUNICATION (NFC) PAYMENT TRANSACTIONS WITH AUTHENTICATION" which is a continuation and claims priority to U.S. application Ser. No. 11/939,821, filed Nov. 14, 2007, titled METHOD AND SYSTEM FOR SECURING TRANSACTIONS MADE THROUGH A MOBILE COMMUNICATION DEVICE, now U.S. Pat. No. 8,290,433, issued on Oct. 16, 2012, all of which is incorporated by reference herein in its entirety.

FIELD OF INVENTION

The present invention relates to data communications and wireless devices.

BACKGROUND OF THE INVENTION

Mobile communication devices—e.g., cellular phones, personal digital assistants, and the like—are increasingly being used to conduct payment transactions as described in U.S. patent application Ser. No. 11/933,351, entitled "Method and System For Scheduling A Banking Transaction Through A Mobile Communication Device", and U.S. patent application Ser. No. 11/467,441, entitled "Method and Apparatus For Completing A Transaction Using A Wireless Mobile Communication Channel and Another Communication Channel, both of which are incorporated herein by reference. Such payment transactions can include, for example, purchasing goods and/or services, bill payments, and transferring funds between bank accounts. Given the sensitive nature of personal money or banking data that may be stored on a mobile communication device as a result of the ability to transact payments, it is critical to protect a user from fraudulent usage due to, e.g., loss or theft of a mobile communication device.

BRIEF SUMMARY OF THE INVENTION

In general, in one aspect, this specification describes a method for transmitting data between a mobile communication device and a server. The method includes running a mobile application on the mobile communication device. The mobile application is hosted on the mobile communication device through a management server. The method further includes transmitting data associated with the mobile application between the mobile communication device and the server, in which transmission of the data between the mobile communication device and the management server is monitored through the management server.

Implementations can include one or more of the following features. Transmitting data can include generating a session key that is only valid for a given communication session between the mobile communication device and the server. The method can further include disabling use of the mobile application running on the mobile communication device through the management server by invalidating the session key. The method can further include timing out a given communication session between the mobile communication device and the management server after a pre-determined amount of time to prevent theft of data that is accessible through the mobile application. Transmitting data associated with the mobile application between the mobile communication device and the management server can include prompting a user to enter a payment limit PIN in response to a pending purchase exceeding a pre-determined amount. The payment limit PIN can be applied to all purchases globally or on a per-payment basis. The method can include use of biometrics to authenticate the user before authorizing the transaction. The mobile application can comprise a payment transaction application that permits a user to perform one or more of the following services including bill payment, fund transfers, or purchases through the mobile communication device. The mobile application can permit a user to subscribe to each of the services separately.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

Figure 1:
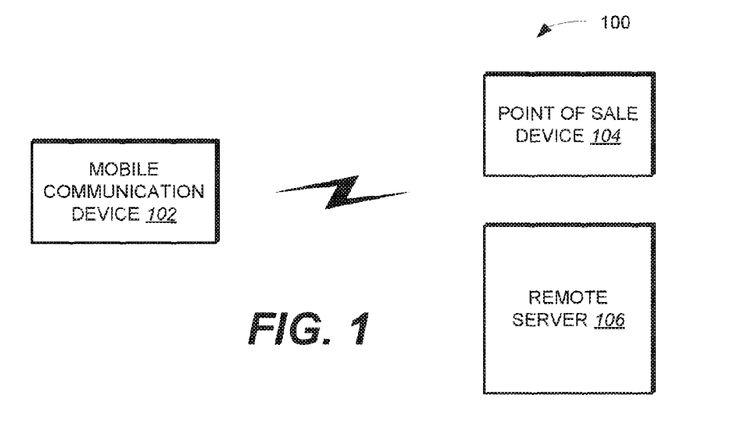
FIG. 1 illustrates one implementation of a block diagram of a communication system including a wireless mobile communication device.

FIG. 1 illustrates one implementation of a communication system 100. The communication system 100 includes a hand-held, wireless mobile communication device 102 a point-of-sale device 104 and a remote server 106. In one implementation, the mobile communication device 102 includes a mobile application (discussed in greater detail below) that permits a user of the mobile communication device 102 to conduct payment transactions. Payment transactions can include, for example, using contactless payment technology at a retail merchant point of sale (e.g., through point of sale device 104), using mobile/internet commerce (e.g., purchase tickets and products, etc.), storage of payment information and other digital artifacts (receipts, tickets, coupons, etc), storage of banking information (payment account numbers, security codes, PIN's, etc.), and accessing banking service (account balance, payment history, bill pay, fund transfer, etc.), and so on.

In one implementation, the mobile application running on the mobile communication device 102 implements one or more of the following tools to secure data that may be stored and presented on the mobile communication device 102 as a result of a payment transaction. The mobile application can implemented one the mobile communication device 102 through a management server which hosts and operates (either independently or through a third-party) the application for use by its customers over the Internet, or other wireless network (e.g., a private network), or a wired network. In one implementation, customers do not pay for owning the software itself but rather for using the software.

In one implementation, the mobile application is accessible through an API accessible over the Web (or other network). The mobile application can include a multi-factored PIN-based login and authentication, and include session keys and have command-level authentication. In one implementation, the mobile application running on the mobile communication device 102 can be remotely locked through a remote server (e.g., remote server 106). In one implementation, a PIN request can be implemented to limit the amount of purchases that can be made. Further, security codes for different payment methods can be implemented to protect a user. Each of these tools is discussed in greater detail below.

Figure 2:
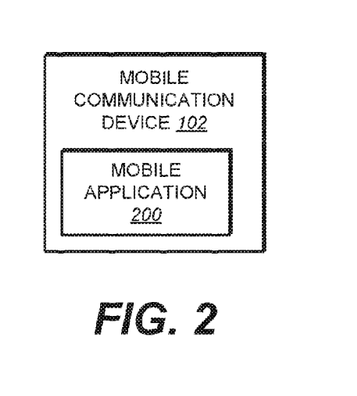
FIG. 2 illustrates one implementation of the wireless mobile communication device of FIG. 1.

FIG. 2 illustrates one implementation of the mobile communication device 102. The mobile communication device 102 includes a mobile application 200 that (in one implementation) is provided to the mobile communication device 102 through a remote server (e.g., remote server 106). In one implementation, the mobile application is a Mobile Wallet application available from Mobile Candy Dish, Inc., of Berkeley, Calif. Providing the mobile application as a hosted service enables central monitoring and management of all security aspects of the service at the remote server. In addition, data (corresponding to a payment transaction) can be stored on the remote server (e.g., remote server 106 (FIG. 1)) in a secure manner. In one implementation, the remote server is a management server that is can be maintained by Mobile Candy Dish or a trusted third party, as described in U.S. patent application Ser. No. 11/933,351. For example, the data can be securely stored on the remote server using conventional PCI guidelines. Hence, in the event the mobile communication device 102 is lost (or stolen), no confidential data can be recovered as no data is stored on the mobile communication device 102. In addition, an added benefit is that a user can recover seamlessly by syncing new mobile communication device (via new installation of the mobile application) with the service. Thus, in one implementation, sensitive information (e.g., banking account numbers, credit card account numbers, expiry dates, and so on) are never stored on the mobile communication device. This reduces risk and exposure of the user's private information and data.

Client Login and Authentication

In general, while effort is made to minimize storage of sensitive user information and data in a memory of a mobile communication device, in one implementation, some data is stored in the memory of a mobile communication device due to reasons of performance, usability and user experience. For example, data may need to be stored on a mobile communication device in the following circumstances. Payment credentials, coupons, tickets, and so on may have to be stored on the secure element of an NFC phone. Account balance, banking payment history, etc., may be locally cached on a mobile communication device. In one implementation, a user can opt-in to save payment method security codes in the client (or mobile application) for convenience. Tickets and/or coupons may be locally cached so that a user can redeem the tickets and/or coupons in an offline mode. For example, a mobile communication device may be offline in a situation in which network connectivity inside a building is degraded, and storing a ticket and/or coupon in a local cache of the mobile communication device permits the user to access the ticket or coupon.

In addition to data partitioning, in one implementation, users have an ability to subscribe to different services. For example, User A may subscribe to "Mobile Payments" and "Mobile Banking" services, while User B may only subscribe to "Mobile Banking" and "What's Nearby" services. Hence, in one implementation, the mobile application includes a mechanism to enable/disable different services on the Client based on particular services to which users are subscribed. Table 1 below illustrates example services that are enabled/disabled based on user subscriptions.

TABLE 1

| USER | SERVICE | SUBSCRIPTION STATUS |
|---|---|---|
| User A | Money Manager | Disabled |
| User B | Money Manager | Transaction Only |
| User C | Money Manager | Transaction, Payment |
| User D | Money Manager | Transaction, Payment, BillPay, FundTransfer |

The above example control access to the Money Manager service and what privileges within the service a given user can perform. This will be used by the Client (mobile application) to enable/disable available features on the Client.

Figure 3:
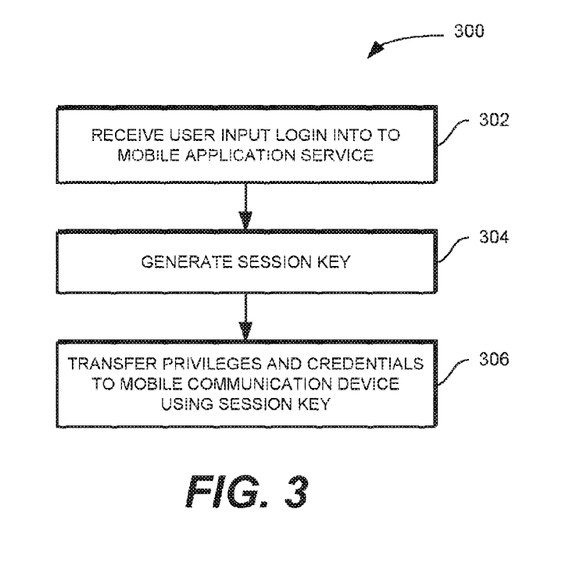
FIG. 3 illustrates one implementation of a method for authenticating a user.
Figure 4:
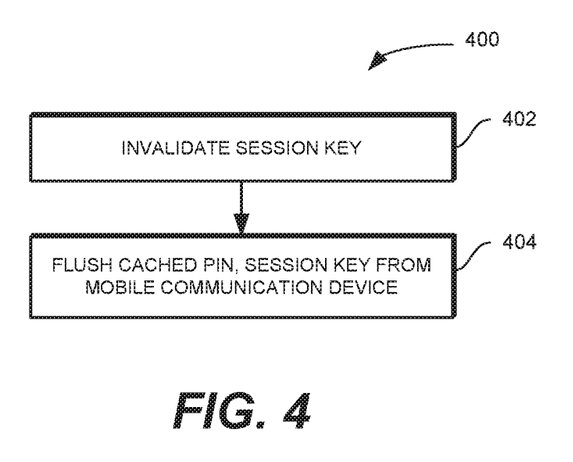
FIG. 4 illustrates one implementation of a method for remotely locking use of a mobile application on a mobile communication device.

In one implementation, when a user subscribes to a mobile wallet the user is assigned credentials that include a unique WalletID, SiteKey, a user-defined PIN, as well as tokens that specify access and privileges for the different services. FIG. 3 illustrates one implementation of a method 300 for authenticating a user. User input is received (through a mobile communication device) logging into the mobile application service (step 302). In one implementation, when a user attempts to login with the client, the user is prompted to enter login credentials (e.g., mobile phone number, 1-time activation code, Wallet PIN, etc.). A session key is generated (step 304). In one implementation, the session key is a unique server-generated session key that is valid only for the duration of a given session. In one implementation, the session key is used to ensure the server can identify the client and ensure that the client has been previously authenticated. Upon a successful login, the server will transfer credentials, service access and privileges (step 306), which are locally cached on the mobile communication device. The service access and privileges control the behavior of the client. In one implementation, to prevent command spoofing, the session key is passed in every API server call. The server will validate (every time) the session key is valid. If valid, the API server call is processed. Failure to validate the session key will cause a failure. In such a case, the client will flush the cached PIN and force the user to re-authenticate (or re-login).

Remote Lock

In one implementation, a mobile application running on a mobile communication device can be remotely locked (or disabled) by invalidating a session key. Users, via calling a Customer Care, a personal web portal, or some other mechanism, can implement changes (e.g., change PIN, etc.) that causes the server to invalidate the session key. In real-time, the next attempt by the client to issue an API server call, validation of the session key will fail, which (in one implementation) causes the client to automatically flush the cached PIN and session key, and force the user to re-authenticate. In addition, the client can perform additional actions, in addition to flushing the cached PIN and session key. This includes, but is not limited to, one or more of the following: changing the secure element mode to effective temporarily or permanently disable the secure element—i.e., a user can remotely alter the state of the smart chip to lock it remotely; and deleting all cached data stored in the memory (or disk) of the mobile communication device.

Session Time Out

In one implementation, while a client is open, a user has access to transaction data. In such an implementation, users who may misplace a mobile communication device while the client is open may expose the user to risk of information theft. Therefore, in one implementation, mobile application (or client) shuts down after a period of inactivity. Additional tasks that can be associated with the shutdown procedure can include, but is not limited to, temporarily shutting down a secure element (of the mobile communication device) to prevent NFC payments, NFC coupon redemption, and NFC ticket redemption.

Payment Limit PIN

For payments (mobile commerce ticket purchase, etc.), in one implementation a user can prevent either fraudulent purchases or accidental purchases by forcing a PIN prompt when a purchase amount exceed a user-specified value. In one implementation, a user can control this behavior globally (e.g., across all users' payment methods) or on a per-payment-method basis. Thus, when a user purchases ticket and selects a payment method (to pay for purchase), if the transaction amount exceeds a specified payment method's limit, the client will trigger and prompt for the PIN. In order to proceed with purchase, the user has to enter the correct PIN. The user's input is validated against the cached PIN on the client. The payment transaction will proceed if validated. Otherwise, an appropriate response is generated to the user. Effectively, this is a mechanism for the user (not the Merchant or Issuing Bank) to throttle/control the dollar amount that can be authorized for various payments and transactions. In the event of a contactless purchase, the client controls the smart chip. In the event of an electronic purchase (ticketing, etc.), a server can manages the controls.

Local Storage of Payment Security Codes

As a convenience to users, a user can opt-in and have only the security codes (CVV, etc.) associated to each of their payment methods locally stores on the client. In one implementation, management tools are provided to add/delete/edit these security codes. In one implementation, the security codes are encrypted (Key Management of encryption key performed by a server) and then only stored in the client on the mobile communication device. In one implementation, security codes are not stored in any form on the server. The encryption key and security codes can be kept separately to prevent fraudulent usage.

Although the present invention has been particularly described with reference to implementations discussed above, various changes, modifications and substitutes are can be made. Accordingly, it will be appreciated that in numerous instances some features of the invention can be employed without a corresponding use of other features. Further, variations can be made in the number and arrangement of components illustrated in the figures discussed above.

What is claimed is:

1. A method for conducting a Near Field Communication (NFC) transaction using an NFC protocol, the method comprising:
   storing a non-browser based-application in a mobile device memory included in the mobile device, wherein the non-browser based application is a mobile operating system platform non browser based mobile application preinstalled or downloaded and installed on the mobile device, the mobile device comprising a mobile device display, a mobile device processor, a mobile device transceiver that supports voice and data interactions through a first communication channel, an NFC transceiver configured to use the NFC protocol through a second communication channel, an NFC processor configured to use the NFC protocol, and a secure element memory, wherein the secure element memory includes an identification code and a secure element application configured to use the NFC protocol;
   receiving, at the non-browser based application, user authentication information, wherein the non-browser based application stored on the mobile device receives the user authentication information via the mobile device display of the mobile device and further wherein the user authentication information includes biometric data;
   upon receipt of the user authentication information, authenticating, at the mobile device, a user associated with the user authentication information before the NFC transaction;
   executing the secure element application by the NFC processor in response to a near field communication inductive signal by an NFC terminal; and
   transmitting, using the secure element application, the identification code via the second communication channel to the NFC terminal, wherein the identification code is transmitted to a server for processing the near field communication transaction using a payment method that corresponds to the identification code.

2. The method of claim 1, wherein the payment method is a default payment method.

3. The method of claim 1, wherein the payment method is a user selected payment method.

4. The method of claim 1, further comprising applying a coupon during the near field communication transaction.

5. The method of claim 1, further wherein a digital artifact is delivered from the server to the mobile device using the first communication channel.

6. The method of claim 5, wherein the digital artifact comprises an advertisement, receipt, ticket, coupon, media, metadata and/or content.

7. The method of claim 5, wherein the digital artifact includes metadata operable to trigger a secondary call-to-action.

8. The method of claim 1, further wherein a digital artifact is received through the NFC transceiver at the secure element after purchase from the NFC terminal during an NEC interaction between the secure element and the NFC terminal using the second communication channel.

9. The method of claim 1, further wherein data stored on the mobile device is encrypted using a mobile operating system native to the mobile device.

10. A mobile device for conducting a Near Field Communication (NFC) transaction using an NFC protocol, the mobile device comprising:
    a mobile device memory including a non-browser based-application, wherein the non-browser based application is a mobile operating system platform non browser based mobile application preinstalled or downloaded and installed on the mobile device;
    a mobile device transceiver that supports voice and data interactions through a first communication channel;
    a mobile device processor that receives, at the non-browser based application, user authentication information, wherein the non-browser based application stored on the mobile device receives the user authentication information via the mobile device display of the mobile device and further wherein the user authentication information includes biometric data; and upon receipt of the user authentication information, authenticating, at the mobile device, a user associated with the user authentication information before the NFC transaction;

an NFC processor that executes a secure element application in response to a near field communication inductive signal by an NFC terminal;

a secure element memory that maintains an identification code and the secure element application configured to use the NFC protocol, wherein the secure element application transmits the identification code through a second communication channel to an NFC terminal in response to the near field communication inductive signal by the NFC terminal, and further wherein the identification code is transmitted to a server for processing the near field communication transaction using a payment method that corresponds to the identification code; and an NFC transceiver configured to use the NFC protocol through the second communication channel.

11. The mobile device of claim 10, wherein the payment method is a default payment method.

12. The mobile device of claim 10, wherein the payment method is a user selected payment method.

13. The mobile device of claim 10, further comprising applying a coupon during the near field communication transaction.

14. The mobile device of claim 10, further wherein a digital artifact is delivered from the server to the mobile device using the first communication channel.

15. The mobile device of claim 14, wherein the digital artifact comprises an advertisement, receipt, ticket, coupon, media, metadata and/or content.

16. The mobile device of claim 14, wherein the digital artifact includes metadata operable to trigger a secondary call-to-action.

17. The mobile device of claim 10, further wherein a digital artifact is received through the NFC transceiver at the secure element after purchase from the NFC terminal during an NFC interaction between the secure element and the NFC terminal using the second communication channel.

18. The mobile device of claim 10, further wherein data stored on the mobile device is encrypted using a mobile operating system native to the mobile device.

19. A non-transitory computer readable medium for conducting a Near Field Communication (NFC) transaction using an NFC protocol comprising:

computer code for storing a non-browser based-application in a mobile device memory included in the mobile device, wherein the non-browser based application is a mobile operating system platform non browser based mobile application preinstalled or downloaded and installed on the mobile device, the mobile device comprising a mobile device display, a mobile device processor, a mobile device transceiver that supports voice and data interactions through a first communication channel, an NFC transceiver configured to use the NFC protocol through a second communication channel, an NFC processor configured to use the NFC protocol, and a secure element memory, wherein the secure element memory includes an identification code and a secure element application configured to use the NFC protocol;

computer code for receiving, at the non-browser based application, user authentication information, wherein the non-browser based application stored on the mobile device receives the user authentication information via the mobile device display of the mobile device and further wherein the user authentication information includes biometric data;

computer code for upon receipt of the user authentication information, authenticating, at the mobile device a user associated with the user authentication information before the NFC transaction;

computer code for executing the secure element application by the NFC processor in response to a near field communication inductive signal by an NFC terminal; and computer code for transmitting, using the secure element application, the identification code via the second communication channel to the NFC terminal, wherein the identification code is transmitted to a server for processing the near field communication transaction using a payment method that corresponds to the identification code.

* * * * *

US009652771C1

(12) EX PARTE REEXAMINATION CERTIFICATE (12511th)
United States Patent
Fisher (10) Number: US 9,652,771 C1
(45) Certificate Issued: Feb. 6, 2024

(54) INDUCTION BASED TRANSACTIONS AT A MOBLE DEVICE WITH AUTHENTICATION

(71) Applicant: Michelle Fisher, Marina Del Rey, CA (US)

(72) Inventor: Michelle Fisher, Marina Del Rey, CA (US)

(73) Assignee: Blaze Mobile, Inc.

Reexamination Request:
No. 90/019,168, Feb. 17, 2023

Reexamination Certificate for:
Patent No.: 9,652,771
Issued: May 16, 2017
Appl. No.: 15/175,150
Filed: Jun. 7, 2016

Related U.S. Application Data (63) Continuation of application No. 13/620,632, filed on Sep. 14, 2012, now Pat. No. 9,378,493, which is a continuation of application No. 11/939,821, filed on Nov. 14, 2007, now Pat. No. 8,290,433.

(51) Int. Cl.
| | | |
|---|---|---|
| H04B 1/38 | (2015.01) | |
| G06Q 20/00 | (2012.01) | |
| G06Q 20/04 | (2012.01) | |
| G06Q 20/10 | (2012.01) | |
| G06Q 20/32 | (2012.01) | |
| G06Q 20/34 | (2012.01) | |
| G06Q 20/36 | (2012.01) | |
| G06Q 20/38 | (2012.01) | |
| G06Q 20/40 | (2012.01) | |
| G06Q 30/0238 | (2023.01) | |
| H04B 5/00 | (2006.01) | |
| H04W 4/80 | (2018.01) | |
| H04W 12/06 | (2021.01) | |
| H04W 12/062 | (2021.01) | |
| H04W 12/082 | (2021.01) | |
| H04L 9/40 | (2022.01) | |
| H04W 88/06 | (2009.01) | |

(52) U.S. Cl.
CPC .......... *G06Q 20/401* (2013.01); *G06Q 20/04* (2013.01); *G06Q 20/102* (2013.01); *G06Q 20/108* (2013.01); *G06Q 20/3223* (2013.01); *G06Q 20/3229* (2013.01); *G06Q 20/326* (2020.05); *G06Q 20/3278* (2013.01); *G06Q 20/3552* (2013.01); *G06Q 20/367* (2013.01); *G06Q 20/382* (2013.01); *G06Q 30/0238* (2013.01); *H04B 5/0031* (2013.01); *H04W 4/80* (2018.02); *H04W 12/062* (2021.01); *H04W 12/068* (2021.01); *H04W 12/082* (2021.01); *G06Q 20/3226* (2013.01); *G06Q 20/3227* (2013.01); *G06Q 20/3821* (2013.01); *H04L 63/102* (2013.01); *H04L 2209/56* (2013.01); *H04W 88/06* (2013.01)

(58) Field of Classification Search
None
See application file for complete search history.

(56) References Cited

To view the complete listing of prior art documents cited during the proceeding for Reexamination Control Number 90/019,168, please refer to the USPTO's Patent Electronic System.

*Primary Examiner* — Nick Corsaro (57) ABSTRACT

A method for transmitting data between a mobile communication device and a server. The method includes running a mobile application on the mobile communication device. The mobile application is hosted on the mobile communication device through the server as a Software as a Service (SaaS). The method further includes transmitting data associated with the mobile application between the mobile communication device and the server, in which transmission of the data between the mobile communication device and the server is monitored through the server.

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-19 is confirmed.

* * * * *